(12) United States Patent
Bucher et al.

(10) Patent No.: US 6,171,059 B1
(45) Date of Patent: Jan. 9, 2001

(54) QUICK ASSEMBLY BLADES FOR CEILING FANS

(75) Inventors: Charles E. Bucher, Valrico; John C. Bucher, Ft. Lauderdale, both of FL (US)

(73) Assignee: King of Fans, Inc., Ft. Lauderdale, FL (US)

( * ) Notice: Under 35 U.S.C. 154(b), the term of this patent shall be extended for 0 days.

(21) Appl. No.: 09/200,607

(22) Filed: Nov. 30, 1998

Related U.S. Application Data

(62) Division of application No. 08/851,501, filed on May 5, 1997, now Pat. No. 6,010,306.

(51) Int. Cl.$^7$ .................................................. F04D 29/34
(52) U.S. Cl. ..................... 416/210 R; 416/5; 416/206; 416/207; 416/214 R; 416/220 A; 416/221; 403/328
(58) Field of Search ................................ 416/5, 240 R, 416/206, 207, 208, 209, 210 R, 214 R, 220 A, 221; 403/325, 327, 328

(56) References Cited

U.S. PATENT DOCUMENTS

| | | | |
|---|---|---|---|
| 324,671 | * 8/1885 | Drake | 403/325 |
| 686,211 | * 11/1901 | Dowson | 416/210 R |
| 2,258,932 | * 10/1941 | Jacbos | 403/325 |
| 2,771,259 | 11/1956 | Laystrom . | |
| 2,932,047 | * 4/1960 | Johnston | 403/328 |
| 2,965,180 | 12/1960 | Killam . | |
| 2,985,245 | * 5/1961 | Maloof | 416/220 A |
| 3,707,303 | * 12/1972 | Petri | 403/328 |
| 4,050,771 | 9/1977 | Watson et al. . | |
| 4,121,495 | 10/1978 | Malo et al. . | |
| 4,511,310 | 4/1985 | Pearce . | |
| 4,850,799 | * 7/1989 | Bucher, Sr. et al. | 416/5 |
| 4,865,485 | * 9/1989 | Finnefrock, Sr. | 403/325 |
| 4,917,442 | * 4/1990 | Johnson | 403/328 |
| 5,397,206 | 3/1995 | Sihon . | |
| 5,462,412 | 10/1995 | Scofield et al. . | |
| 5,794,644 | * 8/1998 | Paylor | 403/328 |
| 5,944,486 | 8/1999 | Hodgkins, Jr. . | |
| 5,944,487 | 8/1999 | Pearce . | |
| 6,010,306 | 1/2000 | Bucher et al. . | |
| 6,039,540 | 3/2000 | Wu . | |

FOREIGN PATENT DOCUMENTS

| | | | |
|---|---|---|---|
| 775028 | * 5/1957 | (GB) | 403/328 |
| 276 219 | 9/1994 | (GB) . | |

* cited by examiner

*Primary Examiner*—Christopher Verdier
(74) *Attorney, Agent, or Firm*—Brian S. Steinberger; Law Offices of Brian S. Steinberger

(57) ABSTRACT

Easy to attach and detach blades for overhead ceiling fans. A first version has a ceiling fan blade with keyhole slots that fit over flat topped fasteners on a mounting arm. Pulling the blade away from the arm locks the slots to the fasteners. A second version is similar to the first and has a decorative bottom cover having snappable tapered protrusions which attach through the keyholes and into mateable through-holes in the mounting arm connection. The third version has a protruding end portion of the blade that fits into a slot in the mounting arm where spring loaded pistons press into grooves in the protrusion end portion of the blade. Latching handles allow users to manually move the pistons. A fourth version has a slot in the blade which fits about a mateable housing in the mounting arm where opposing spring loaded pistons press into interior wall grooves in the slot of the blade. A fifth version has the blade with slots fit over the end of the mounting arm so that pulling the blade from the mounting arm causes spring loaded piston to interlock into a interior wall groove in the slot of the blade.

11 Claims, 9 Drawing Sheets

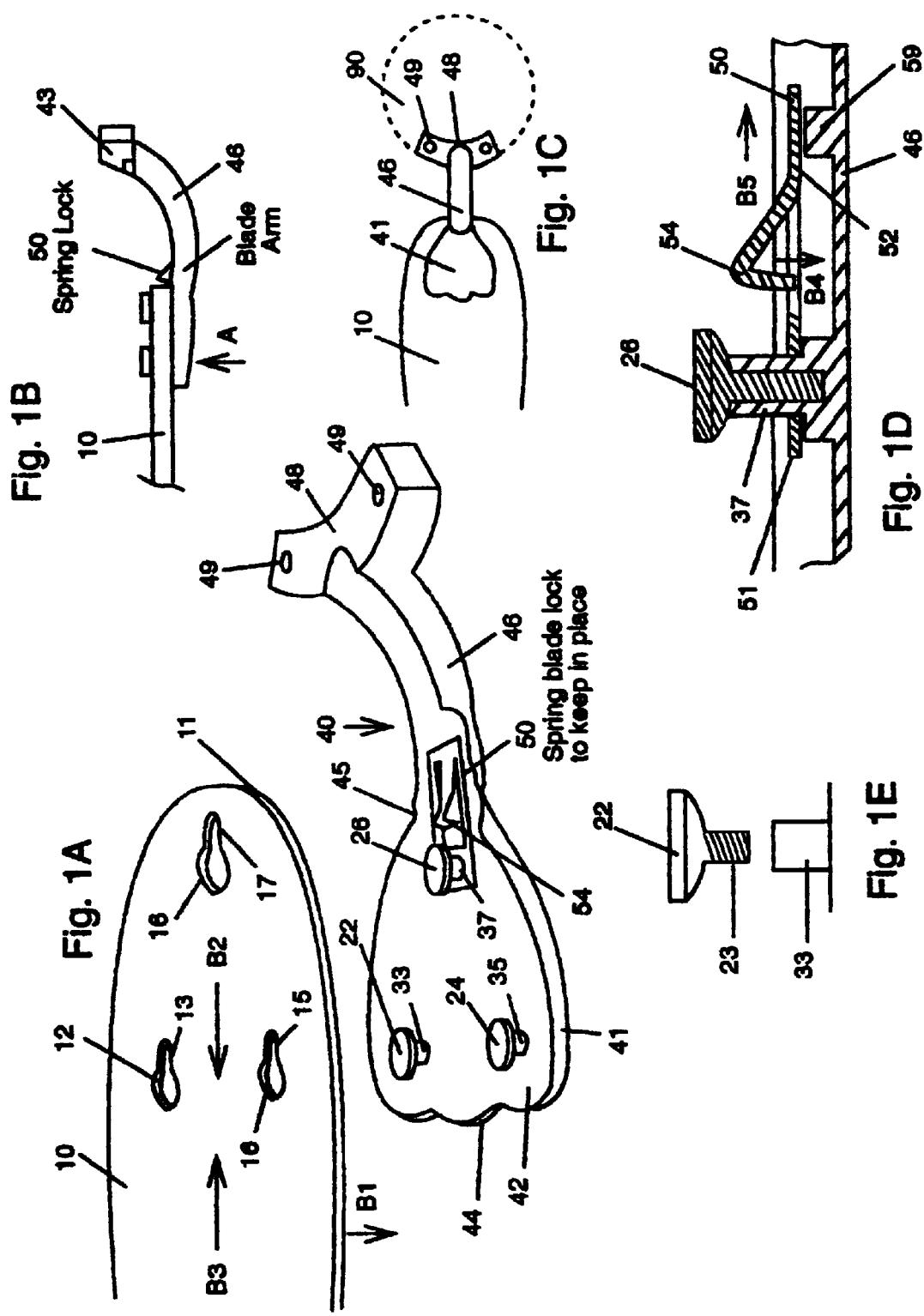

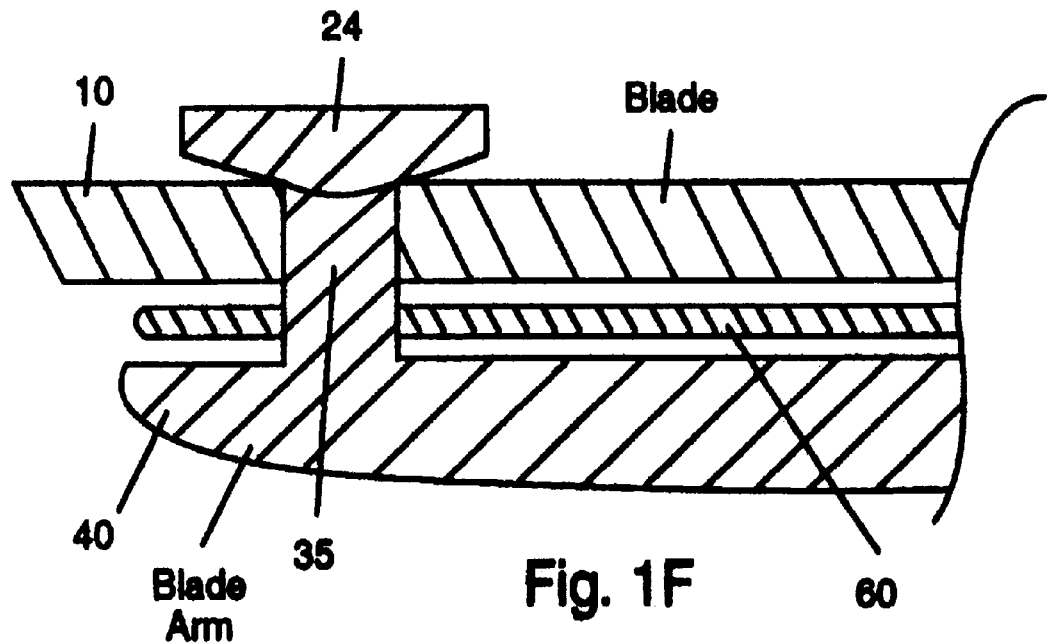
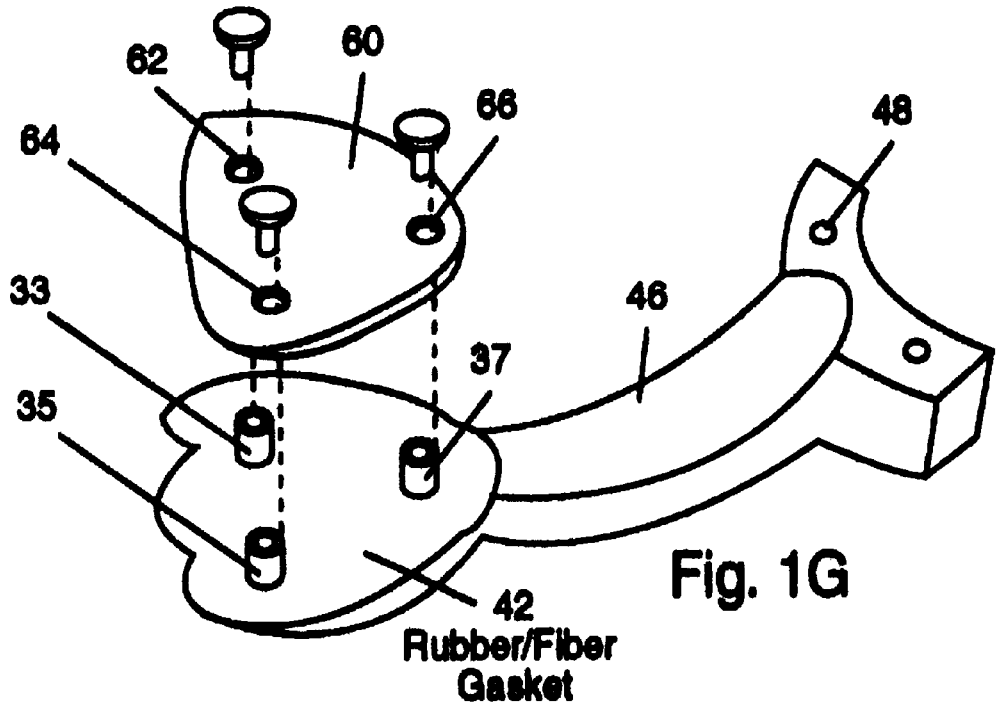

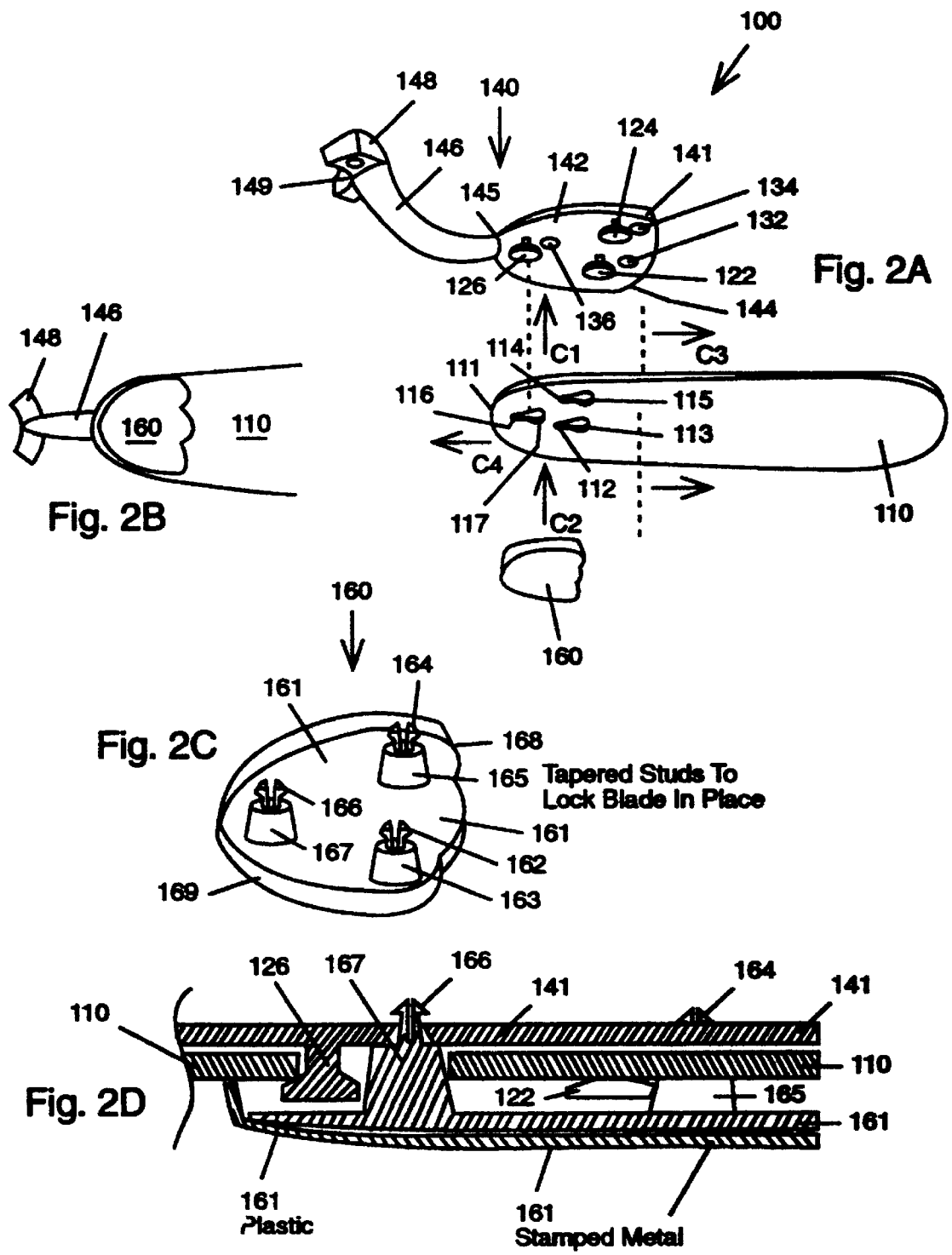

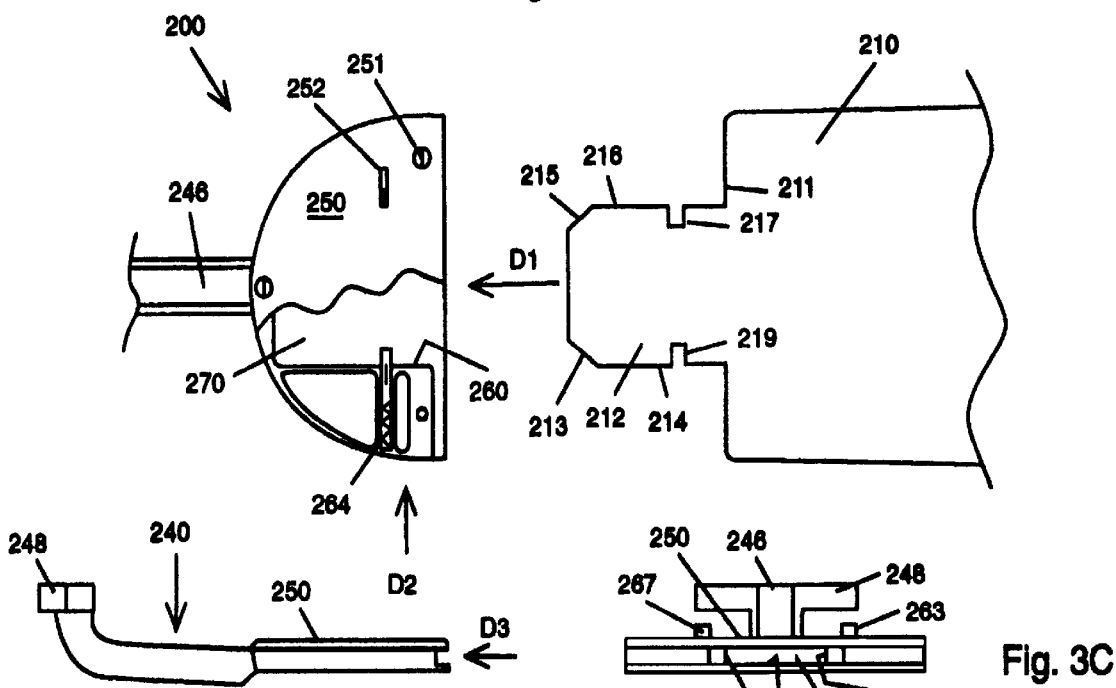

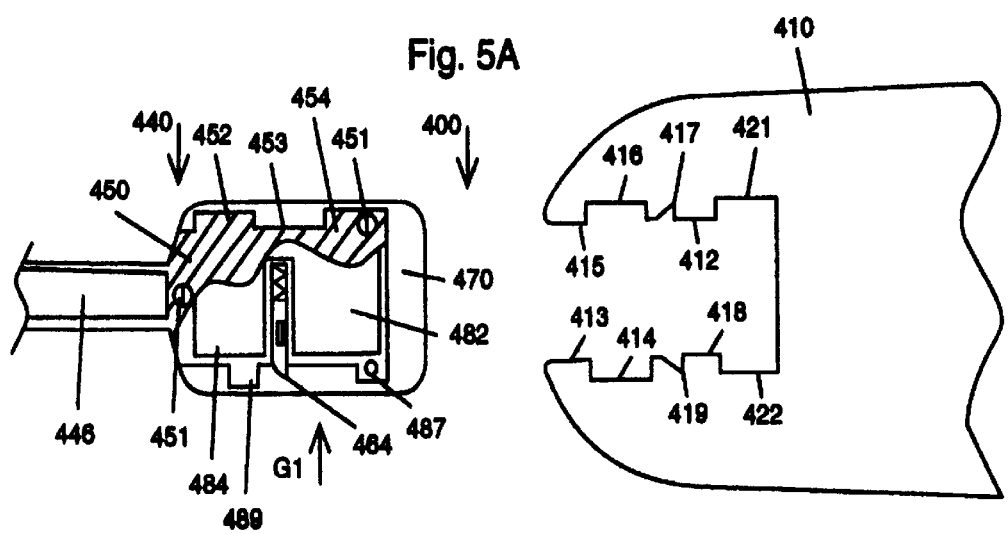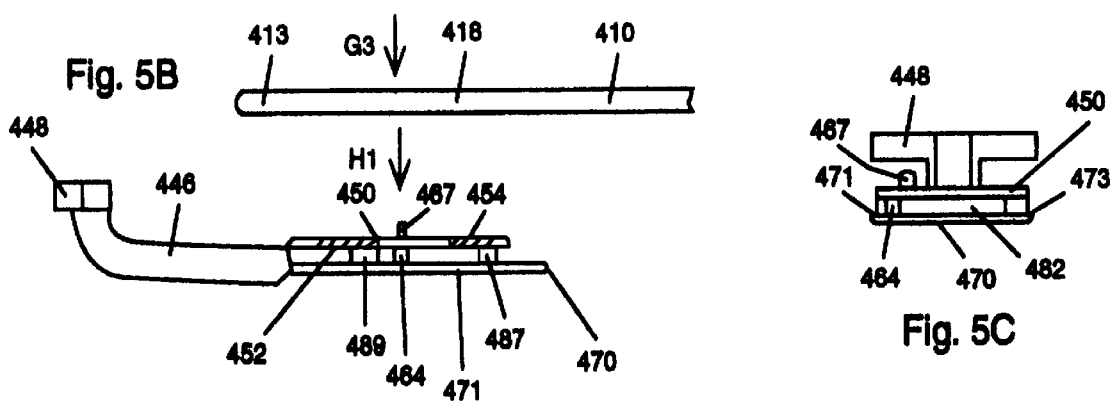

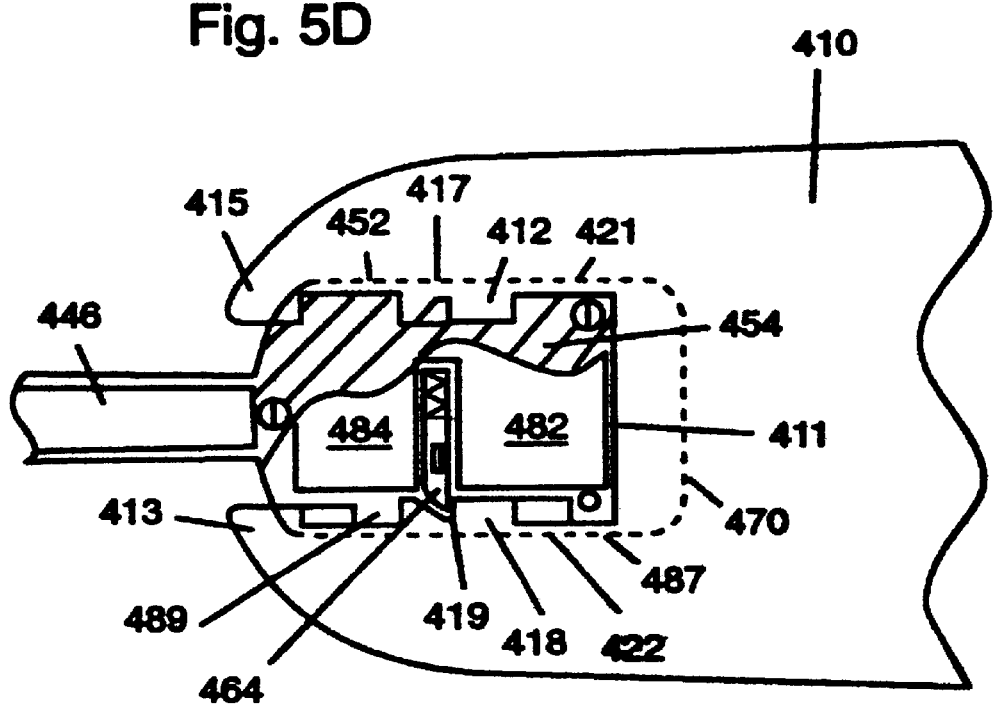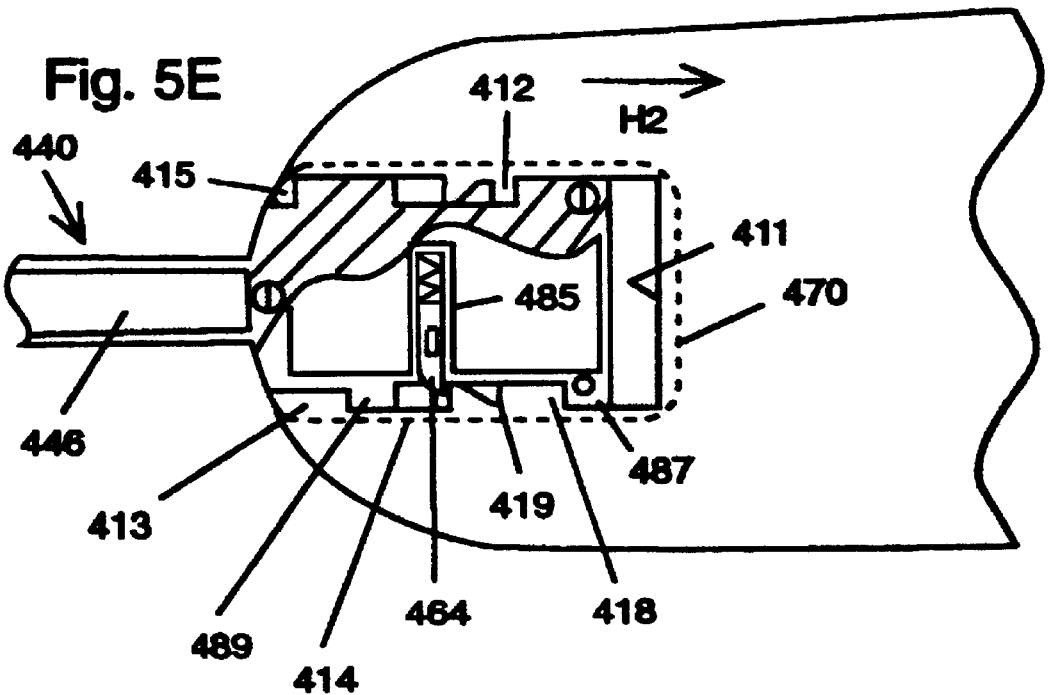

QUICK ASSEMBLY BLADES FOR CEILING FANS

This is a Divisional of application Ser. No. 08/851,501 filed May 5, 1997 now U.S. Pat. No. 6,010,306.

This invention relates to ceiling fans, and in particular to easy to attach and detach blades for overhead ceiling fans.

BACKGROUND AND PRIOR ART

Ceiling fans primarily have blades that are attached to the motor housing brackets by multiple screws and the like, Screwing the blades onto a ceiling mounted motor is not only difficult to accomplish, but results in most ceiling fans in the market place having visible screws that are unsightly. Furthermore, the underside location of the fastener screws detracts from the appearance of the ceiling fan itself. Another problem is from the ceiling fans having to run under continuous vibration conditions where the screws can loosen causing the blades to be accidentally released and result in damages to surrounding property and people in the vicinity.

Furthermore, ceiling fan blades need to be cleaned to remove dirt and dust buildup.

Current techniques have relied on manually holding brushes to the blades themselves which inherently tires the muscles in the cleaner's neck, shoulders, arms and hands. This messy cleaning with brushes causes the dirt to fall on both the cleaner and furniture and flooring below the fan.

Attempts have been made at changing the attachment methods for the blades but still fail to overcome all the problems presented above. U.S. Pat. No. 4,884,947 to Rezek describes a cover for covering the blade to motor connections but still uses screw fasteners that have the problems described above. U.S. Pat. No. 5,180,284 to Monrose III et al. is entided a "Detachable Blades for Ceiling Fans" and U.S. Pat. No. 5,433,585 to Yan has a removable pin connection for ceiling fan blades, but each of these patents still requires screw on brackets for both the motor housing and the blades. Similarly U.S. Pat. No. 4,396,352 to Pearce and U.S. Pat. No. 5,520,515 to Bailey et al. describe pitch adjustment attachments for ceiling fans but also still require screw on brackets between both the motor housing and the attached blades. A still further problem of many of these detachable ceiling fan type blades is that natural centrifugal forces of the spinning fans increase the chances of dislodging the blades.

Thus, the need exists for a solution to the above presented problems with the prior art.

SUMMARY OF THE INVENTION

The first objective of the present invention is to provide detachable blades for ceiling fans that are easy and quick to install.

The second object of this invention is to provide detachable blades for ceiling fans that allow each blade to be locked in place to the motor housing.

The third object of this invention is to provide detachable blades for ceiling fans that are adaptable to standard ceiling fan blades.

The fourth object of this invention is to provide detachable blades for ceiling fans wherein the centrifugal force of the fans actually locks the blades in place.

A first embodiment of the detachable blade and mounting arm assembly for a ceiling fan includes a blade having three triangularly arranged keyhole slots at one end, and a ceiling fan motor connected mounting arm having an opposite end with three flat top shaped fasteners so that the keyholes are positioned over the the flat top shaped fasteners and locked by the longitudinal slot portions of the keyhole slots, after which a spring clip holds the position of the blade to the mounting arm. Optionally, a gasket can be inserted between the blade and the mounting arm.

A second embodiment is similar to the first but includes a decorative cap cover with an upward projecting fastener having expandable tips for being inserted within the keyhole slots of the blade and snappably attach into mating throughholes on the mounting arm.

A third embodiment has a slot in the end of the ceiling fan mounting arm for receiving a protruding end of the blade, the protruding end having angled corner edges. Spring loaded pistons rods in the mounting arm which face one another can fit into mateable grooves in the protruding end of the blade. The rods can be manually moved back to release the blades by handles.

A fourth embodiment has a single planar blade with an end having a slot. The mounting arm has an end with two parallel plates separated from one another by a central housing having back to back spring loaded piston rods. Passing the slotted end of the blade around the central housing so that the piston rods expand into grooves within the interior walls of the slot opening of the blade. Overhanging portions of the parallel plates further support the sides of the blade about the slot. Latch handles attached to the piston rods allow a user to manually move the piston rods against their respective springs to release the blade from the mounting arm.

A fifth embodiment has a single planar blade with an end having a slot with grooved interior walls. The mounting arm has an end with a top plate having uneven sides separated from a substantially rectangular bottom plate by a central housing having a spring loaded piston rod. The slotted end of the blade is positioned over the top plate so that the sides of the slot can abut against the bottom plate. Pulling the blade away from the mounting arm causes the piston rod to expand into a groove within the interior wall of the slot opening of the blade. The grooves and overhanging portions of the top plate and bottom plate prevents centrifugal forces caused from spinning the blade to dislodge the blade. Overhanging portions of the top and bottom plates further support the sides of the blade about the slot. A latch handle attached to the piston rod allows a user to manually move the piston rod its spring to release the blade from the mounting arm.

Further objects and advantages of this invention will be apparent from the following detailed description of a presently preferred embodiment which is -illustrated schematically in the accompanying drawings.

BRIEF DESCRIPTION OF THE FIGURES

FIG. 1A is an exploded view of a first preferred embodiment of the novel attachable and detachable blade and arm.

FIG. 1B is a side view of the embodiment of FIG. 1A with the blade and arm attached to one another.

FIG. 1C is a bottom view of FIG. 1B along arrow A.

FIG. 1D is an enlarged view of the spring lock attachment for the embodiment of FIG. 1A.

FIG. 1E is an enlarged view of a flat head screw fastener for use with embodiment of FIG. 1A.

FIG. 1F is a side cross-sectional view of FIG. 1B with an optional gasket.

FIG. 1G is an exploded view of the optional gasket and mounting arm of FIG. 1F.

FIG. 2A is an exploded view of a second preferred embodiment of the detachable blade and arm.

FIG. 2B is a bottom view of the second preferred embodiment of FIG. 2A.

FIG. 2C is a perspective view of the upper surface of the cover cap used in FIGS. 2A–2B.

FIG. 2D is a cross-sectional view of an assembled FIG. 2A along the direction of arrow C3.

FIG. 3A is a top exploded view of a third preferred embodiment of the detachable blade and arm.

FIG. 3B is a side view of the mounting arm of FIG. 3A along arrow D2.

FIG. 3C is a front view of the mounting arm of FIG. 3B along arrow D3.

FIG. 5A is an exploded view of a fifth preferred embodiment of the detachable blade and arm.

FIG. 5B is a side view of the mounting arm of FIG. 5A along G1 and the blade positioned above.

FIG. 5C is a front view of the mounting arm of FIG. 5B along arrow G2.

FIG. 5D is a top view of the blade first positioned over the mounting arm.

FIG. 5E is a top view of the blade and mounting arm of FIG. 5D after blade is pulled in the direction of arrow H2.

DESCRIPTION OF THE PREFERRED EMBODIMENT

Figure 3E:
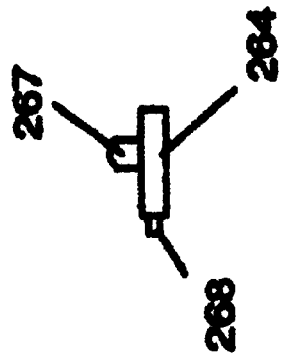
FIG. 3E is a side view of the latching piston for use with the embodiment of FIGS. 3A–3D.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1A is an exploded view of a first preferred embodiment 1 of the novel attachable and detachable blade 10 and mounting arm 40. FIG. 1B is a side view of the embodiment 1 of FIG. 1A with the blade 10 and arm 40 attached to one another. FIG. 1C is a bottom view of FIG. 1B along arrow A. FIG. 1D is an enlarged view of the spring lock attachment 50 for the embodiment of FIG. 1A. FIG. 1E is an enlarged view of a flat head screw fastener 22 for use with embodiment 1 of FIG. 1A. Referring to FIGS. 1A–1E, planar shaped ceiling fan blade 10 includes three keyhole slots arranged in a triangular pattern through the wide planar portion 11 of the blade 10. Each keyhole slot includes a wide diameter bases 12, 14, 16, and a narrow longitudinal portion 13, 15, 17, respectively. Mounting arm 40 includes a flat generally heart shaped blade mounting portion 41 having decorative ridged edge 44 across one end and a narrower region 45 connecting to a curved narrow connecting arm portion 46. Flat headed fasteners such as Philips head or regular head screws 22, 24, 26 have threads (only thread 23 is shown in FIG. 1E) which screwably attach to mateably threads within hollow stems 33, 35, 37, respectively. A spring clip 50 has an elongated metal steel strip base with one end 51 wrapped about stem 37 above raised step 57 and the other end 52 abutting against raised step 59. Spring bent tab 54 has a flat strip base 50 can be further attached to an upper portion of curved narrow connecting arm portion 46 by and adhesive. The other end of mounting arm 40 includes a curved ceiling fan motor mount 48 having through-holes 49 that enable fasteners such as screws(not shown) for mounting to a centrally located conventional ceiling fan motor 90 (represented in FIG. 1C). Optionally, rubber washers/grommets can be used with stems 33, 35, 37 to provide vibration isolation and a closer fit between the wood and metal components.

To be used, the wide diameter areas 12, 14, and 16 are positioned to fit down in the direction of arrow B1, over and about the flat headed fasteners 22, 24, and 26. Simultaneously, the bent tab 54 of the spring clip 50 protrudes through longitudinal key slot opening 17. Sliding and pulling the blade 10 outward in the direction of arrow B2, causes the bent tab 54 to depress in the direction of arrow B4. As tip 1 clears over, bent tab 54 pops up so that the bottom face of blade 10 abuts flush against upper surface 42 of blade mounting portion 41. The natural expansion of bent tab 54 of spring clip 50 keeps blade tip 11 pushed in the direction of arrow B2 allowing keyhole narrow longitudinal portions 13, 15, and 17, to surround stems 33, 35, and 37, respectively. By depressing bent tab 54 in the direction of arrow B4, blade 11 can be pushed in the direction of arrow B5 to allow the keyhole wide diameter areas 12, 14 and 16 to be able to pass about flat headed fasteners 22, 24, 26, thereby allowing the blade to be detached from the mounting arm 40.

FIG. 1F is a side cross-sectional view of FIG. 1B with an optional gasket 60. FIG. 1G is an exploded view of the optional gasket 60 and mounting arm 40 of FIG. 1F. Referring to FIGS. 1F and 1G, a flat gasket formed of material such as but not limited to rubber and plastic can be shaped to conform to the perimeter shape of hear shaped blade mounting portion 41 allowing the blade 10 to be more tightly attached to mounting arm 40.

FIG. 2A is an exploded view 100 of a second preferred embodiment of the detachable blade 110, mounting arm 140 and cover cap 160. FIG. 2B is a bottom view of the second preferred embodiment 100 of FIG. 2A. FIG. 2C is a perspective view of the upper surface 161 of the cover cap 160 used in FIGS. 2A–2B. FIG. 2D is a cross-sectional view of an assembled embodiment 100 of FIG. 2A along the direction of arrow C3.

Referring to FIGS. 2A–2D, embodiment 100 includes planar shaped ceiling fan blade 110 having three keyhole slots arranged in a triangular pattern through the wide planar portion 111 of the blade 110. Each keyhole slot includes a wide diameter bases 113, 115, 117 and a narrow longitudinal portions 112, 114, 116, respectively. Mounting arm 140 includes a flat generally paddle shaped blade mounting portion 141 having an outer wider end 144 and a narrower region 145 connecting to a curved narrow connecting arm portion 146. Flat headed fasteners with stems (such as those described in the previous embodiment) 122, 124, 126 are arranged in a triangular pattern on the underside 142 of blade mounting portion 141. The other end of mounting arm 140 includes a curved ceiling fan motor mount 148 having through-holes 149 that enable fasteners such as screws (not shown) for mounting to a centrally located conventional ceiling fan (not shown). A cover cap 160 has a molded plastic base 161 with a decorated ridged end 168 and an opposite narrower tip end. Stud projections 162, 164 and 166 each being expandable and depressible with flattened tips, each having tapered bases 163, 165, 167 can be molded as part of the plastic base 161.

In operation, each wide diameter bases wide diameter bases 113, 115, 117 of the keyhole slots in the blade 110 are moved in the direction of arrow C1 to overly respective flat head fasteners 122, 124 and 126 until blade 110 is flush to abut against surface 142. Then blade 110 is moved in the direction of arrow C3 until the stem portions of the respective flat head fasteners 122, 124 and 126 surround respective keyhole narrow longitudinal portions 112, 114, 116. Next cover cap 160 is moved in the direction of arrow C2 so that expandable stud projections 162, 164 and 166 pass through wide diameter openings 113, 115 and 117 and through narrower matching through-holes 132, 134 and 136 after which the angled heads of the stud projections expand to snappably lock the cover cap 160 and blade 110 to mounting arm 140. Individually squeezing each of the angled stud projection tips and reversing the assembling steps allows the blade 110 to be removed.

Figure 3D:
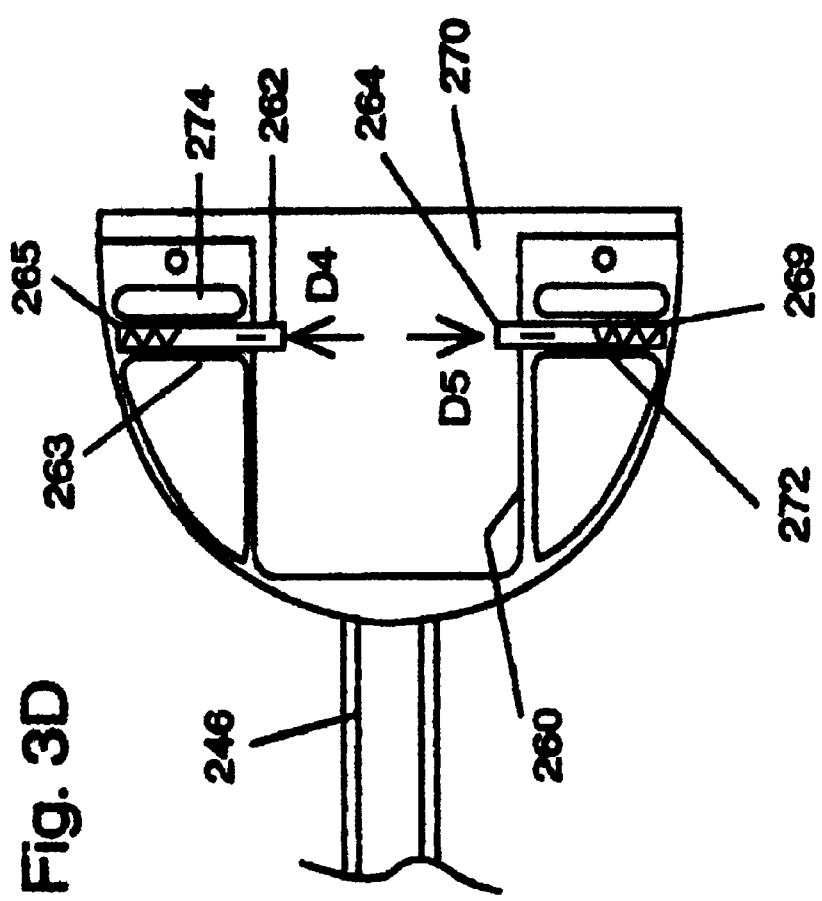
FIG. 3D is a top view of the mounting arm of FIG. 3A without a cover plate.

FIG. 3A is a top exploded view 200 of a third preferred embodiment of the detachable blade 210 and mounting arm 240, 250. Components 246 and 248 conform to similar components of the preceding embodiments. FIG. 3B is a side view of the mounting arm 240, 250 of FIG. 3A along arrow D2. FIG. 3C is a front view of the mounting arm 240, 250 of FIG. 3B along arrow D3. FIG. 3D is a top view of the mounting arm 240, 250 of FIG. 3A without a cover plate 250. FIG. 3E is a side view of the latching piston 264 for use with the embodiment 200 of FIG. 3A. Referring to FIGS. 3A–3E, embodiment 200 includes a mounting arm 240 with blade mounting section wherein a semi-circular top flat plate 250 is attached to a like bottom plate 270 by screw fasteners 251 with a rectangular slot opening 260 therebetween. Two latching pistons 262, 264 each having latching handles 263, 267 pass through openings 252 in top plate 250. inner springs 265 and 269 allow the pistons 262, 264 to move in the direction of arrows D4 and D5, respectively within cylindrical housings 272,274. Inner end 212 of ceiling fan blade 210 has a narrow width portion with angled outer edges 213, 215 and interior facing grooved indentations 217, 219. Moving blade 210 in the direction of arrow D1 inserts narrow planar end 212 into slot 260 so that sides 214, 216 slide along interior sides 261, 269 of slot 260. The outer angled edges 213, 215 cause pistons 262, 264 to compress their respective springs 269 and 265, respectively, until the pistons 262, 264 expand and snap into the grooved indentations 217, 219 of the blade 210. To remove the blade 210, latching handles 263, 267 are manually moved in the direction of arrows D4 and D5, respectively, allowing blade 210 to be separated from slot 260 of mounting arm 240.

Figure 4A:
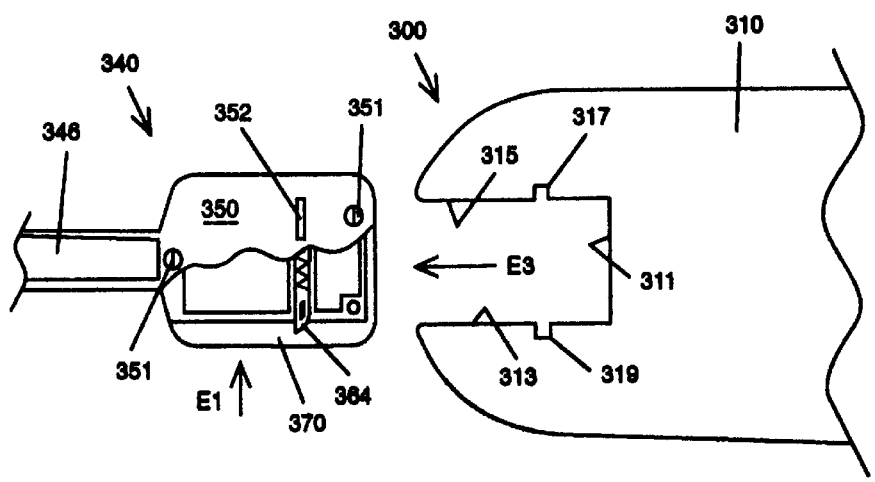
FIG. 4A is an exploded view of a fourth preferred embodiment of the detachable blade and arm.
Figure 4B:
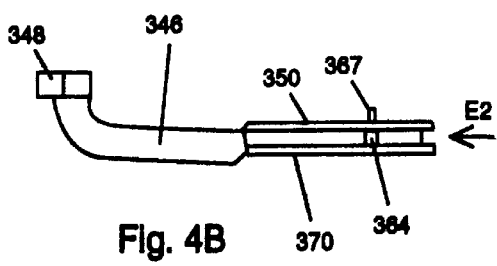
FIG. 4B is a side view of the mounting arm of FIG. 4A along arrow E1.
Figure 4C:
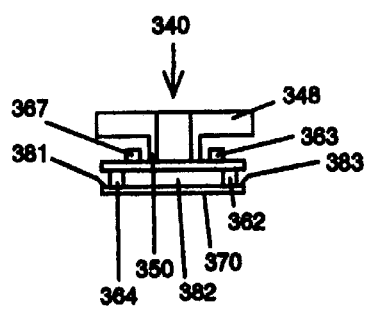
FIG. 4C is a front view of the mounting arm of FIG. 4B along arrow E2.
Figure 4D:
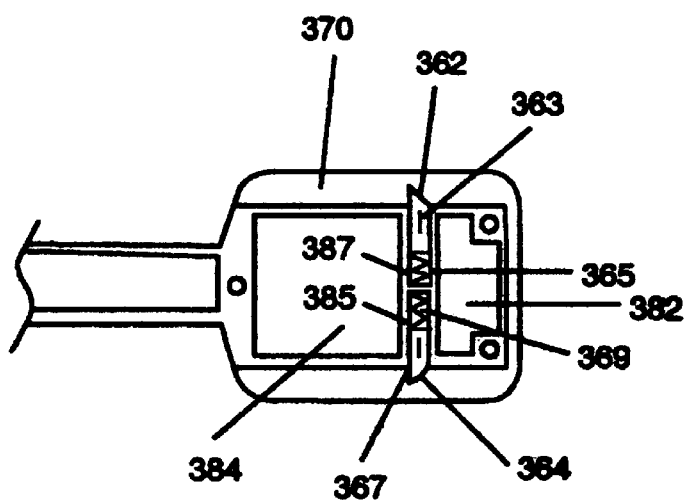
FIG. 4D is a top view of the mounting arm assembly of FIGS. 4B–4C without a top plate cover.
Figure 4E:
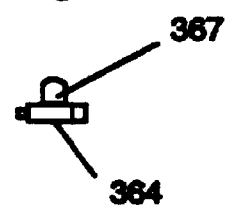
FIG. 4E is a side view of the latching piston for use with the embodiment of FIGS. 4A–4D.

FIG. 4A is an exploded view of a fourth preferred embodiment 300 of the detachable blade 310 and mounting arm 340. FIG. 4B is a side view of the mounting arm 340 of FIG. 4A along arrow E1. FIG. 4C is a front view of the mounting arm 340 of FIG. 4B along arrow E2. FIG. 4D is a top view of the mounting arm 340 of FIGS. 4B–4C without a top plate cover 350. FIG. 4E is a side view of the latching piston 364 and latching handle 367 for use with the embodiment 300 of FIGS. 4A–4D. Referring to FIGS. 4A–4E, mounting arm 340 includes curved narrow connecting arm portion 346 and curved ceiling fan motor mount 348 similar to those described in the previous embodiments. Arm mount 340 further includes two parallel plates 350 and 370 which are connected to one another through a central housing 382 and 384 by screw fasteners 351. The width of central housing 382, 384, is smaller that the width of the plates 350, 370 so that edges of the plates 350, 370 form overhanging lips 381, 383 to the sides of central housing 382, 384(shown more clearly in FIG. 4C. Between central housings 382, 384 are dual chambers 387, 385 for supporting two opposing piston rods 362, 364 each having angled outer tips. Piston rods 362, 364 are supported at their respective rear portions by opposing springs 365 and 369, respectively, so that the piston rods 362 and 364 can compress within their respective chambers 387 and 385.

Referring again to FIGS. 4A–4E, a partial view of a single planar blade 310 is shown having a generally rectangular shaped slot opening 311, 313, 315 through the blade 310 at one end and opposing interior grooves 317, 319. When blade 310 is moved in the direction of arrow E3, the inner side walls 313, 315 of the slot pass through the overhanging lip areas 381, 383 between the parallel plates 350 and 370 of the mounting arm 340. Outer angled tips of piston rods 362, 364 cause the piston rods to compress against their respective springs 365, 369 until side grooves 317 and 319 within the blade 310 allow the piston rods 362, 364 to expand into the side grooves 317, 319 locking the blade 310 to the mounting arm 340. Latch handles 363 and 367 can be manually moved towards each other to allow the blade 310 to be separated from mounting arm 340.

FIG. 5A is an exploded view of a fifth preferred embodiment 400 of the detachable blade 410 and mounting arm 440. FIG. 5B is a side view of the mounting arm 440 of FIG. 5A along G1 and the blade 410 positioned above. FIG. 5C is a front view of the mounting arm 440 of FIG. 5B along arrow G2. FIG. 5D is a top view of the blade 410 first positioned over the mounting arm 440. FIG. 5E is a top view of the blade 410 and mounting arm 440 of FIG. 5D after blade 410 is pulled in the direction of arrow H2.

Referring to FIGS. 5A–5C, mounting arm 440 includes curved narrow connecting arm portion 446 and curved ceiling fan motor mount 448 similar to those described in the previous embodiments. Arm mount 440 further includes top plate 450 with uneven sides and bottom substantially rectangular planar plate 470 which are connected to one another through a central housing 482 and 484 by screw fasteners 451. Central housing 484 has side extension portions 489 on both sides (only one is shown) and central housing 482 has front side extension portions 487 on both sides (only one is shown). Top plate 450 has opposing side wings 452 (only one is shown) and front edge wings 454 (only one is shown). Side wings 452 and 454 are larger in size than side extension portions 487, 489. The width of central housing 482, 484 with side extensions 487, 489, is smaller than the width of the plates 450, 470 so that side wings 452, 454 of the plates 450, and sides 471, 473 of bottom plate 470 form overhanging lips to the sides of central housing 482, 484 (shown more clearly in FIG. 5C).

Referring to FIG. 5A, planar blade 410 has a generally rectangular shaped slot formed between opening tip portions 413, 415, first cut-out rectangular grooves 414, 416, opposing angular grooves 417, 419, and extending rear tip portions 412, 418 with rear cut-out rectangular grooves 421, 422 and end wall 411.

Assembling the blade 410 to the mounting arm 440 is first shown by FIG. 5B, where front and rear tip portions 413, 415 and 412, 418 of blade 410 are positioned parallel to and over and in front of top plate wings 452 and 454. FIG. 5D is a top portion of blade 410 after being laid over mounting arm 440 so that interior extending portions 413, 415, 412, 418 of the blade slot 410 fit about wings 452, 454 of top plate 450 and central housing side extensions 487, 489 to abut against bottom plate 470. Next blade 410 is pulled away from mounting arm 440 in the direction of H2 as finally shown in FIG. 5E so that piston rod 464 compresses into chamber 485 and then extends outward into blade slot cut-out groove 414 and central housing side extensions 489 abut against portions of blade slot tip portions 413, 415. Blade slot tip portions 413, 415 also become sandwiched between top plate wings 452, 454 and bottom plate lips 471, 473 of bottom plate 470. Furthermore, central housing side extensions 487 abut against blade slot rear tip portions 412, 418. Blade slot rear tip portions 412 and 418 also become sandwiched between top plate wings 454 and bottom plate lips 471, 473. The final assembled arrangement of FIG. 5E keeps blade 410 locked into mounting arm 410 when centrifugal forces occur when the blade 410 is spinning. To remove the blade 410 from the mounting arm 440, latch handle 467 is moved back against spring 469, and the above steps are then reversed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A detachable blade and mounting arm assembly for a ceiling fan, comprising in combination:
   a single planar blade having an interior protruding end and a groove on an exterior periphery of the interior protruding end;
   a mounting arm having a first end attached to a ceiling fan motor and a second end having a slot for receiving the interior protruding end of the blade; and
   expandable spring means within the slot, wherein the interior protruding end of the blade can be locked in the slot by the expandable spring means that are expandable into the groove of the protruding end.

2. The detachable blade and mounting arm assembly of claim 1, wherein the protruding end includes:
   an angled corner edge.

3. The detachable blade and mounting arm assembly of claim 1, wherein the expandable spring means includes:
   a piston rod having one end connected to a spring within a chamber and a second end for projecting into the groove of the protruding end; and
   a latch handle for allowing a user to manually move the piston rod against the spring.

4. The detachable blade and mounting arm assembly of claim 1, further comprising:
   two parallel plates attached to the second end of the mounting arm, the two plates separated from one another by the protruding end, wherein sides of the plates overhang sides of the protruding end.

5. The detachable blade and mounting arm assembly of claim 1, wherein the expandable spring means includes:
   dual expandable spring means within the slot, the dual expandable spring means having exterior ends which face one another.

6. A detachable blade and mounting arm assembly for ceiling fans, comprising in combination:
   a single planar blade having a blade end and a mounting end, the mounting end having a slot with uneven interior side grooves; and
   a mounting arm having a first end attached to a ceiling fan motor and a second end having a protruding end with uneven side edges that are mateable to the uneven interior side grooves in the slot on the mounting end of the blade, the slot of the mounting end of the blade being laid over the protruding end of the mounting arm and the blade is moved into a hold position.

7. The detachable blade and mounting arm assembly of claim 6, further comprising:
   a top plate having uneven sides;
   a bottom rectangular plate having generally even sides, the top plate and the bottom plate separated from one another by the protruding end, wherein portions of the uneven sides of the top plate and the even sides of the bottom plate overhang sides of the protruding end so that grooved interior walls of the slot allow the blade to be positioned over the top plate and to abut against the bottom plate.

8. The detachable blade and mounting arm assembly of claim 6, further comprising:
   an expandable spring means for locking the blade into the hold position.

9. A detachable blade and mounting arm assembly for ceiling fans, comprising in combination:
   a single planar blade having a blade end and a mounting end, the mounting end having a slot with an interior side groove;
   a mounting arm having a first end attached to a ceiling fan motor and a second end having a protruding end for being insertable into the slot on the mounting end of the blade; and
   expandable spring means on the protruding end of the mounting arm, wherein the protruding end of the blade can be locked into the slot on the blade by the expandable spring means that are expandable into the interior side groove within the slot on the blade.

10. The detachable blade and mounting arm assembly of claim 9, wherein the expandable spring means includes:
    an angled exterior edge.

11. The detachable blade and mounting arm assembly of claim 9, wherein the expandable spring means includes:
    dual expandable spring means on the protruding end of the mounting arm, the expandable spring means having exterior ends which face in opposite directions to one another.

* * * * *